May 2, 1961 G. D. WINKLER 2,982,302
FLUID CONTROL APPARATUS
Filed Oct. 8, 1959 2 Sheets-Sheet 1
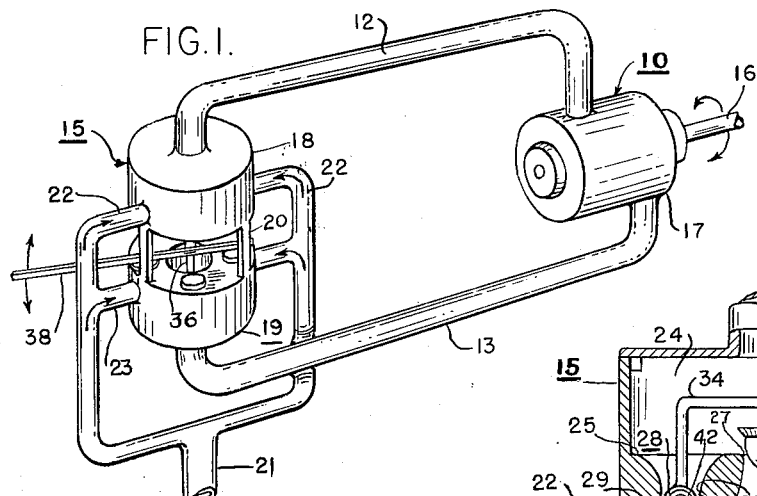
FIG.1.
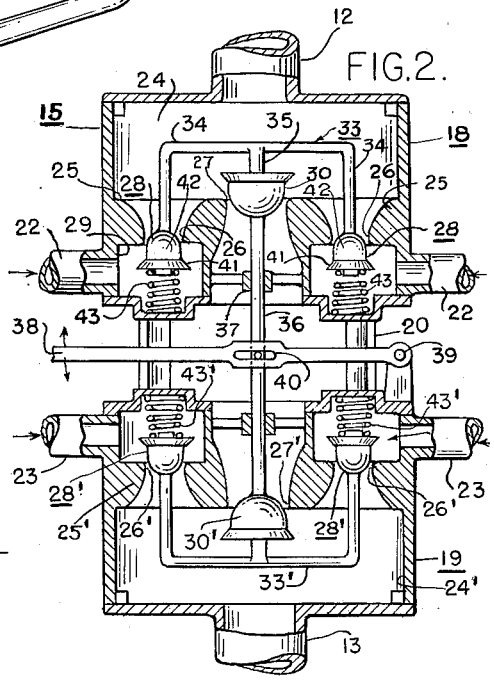
FIG.2.
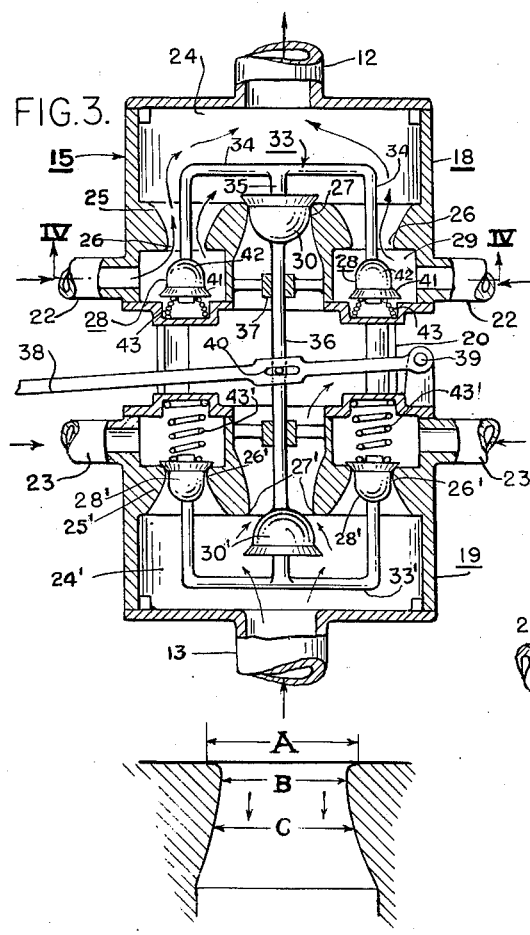
FIG.3.
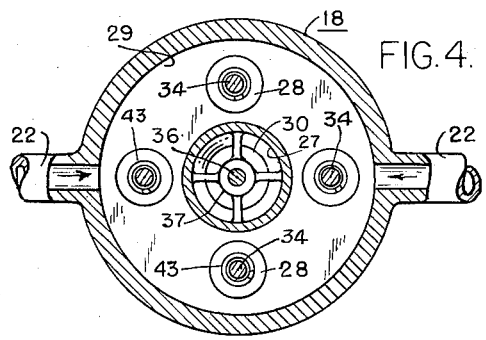
FIG.4.
FIG.5.
INVENTOR
GLENN D. WINKLER
BY May 2, 1961 G. D. WINKLER 2,982,302
FLUID CONTROL APPARATUS
Filed Oct. 8, 1959 2 Sheets-Sheet 2

INVENTOR
GLENN D. WINKLER

United States Patent Office 2,982,302
Patented May 2, 1961

2,982,302
FLUID CONTROL APPARATUS

Glenn D. Winkler, Kansas City, Mo., assignor to Westinghouse Electric Corporation, East Pittsburgh, Pa., a corporation of Pennsylvania Filed Oct. 8, 1959, Ser. No. 845,276

3 Claims. (Cl. 137—596.1)

This invention relates to valves for controlling fluid flow, more particularly to valves for controlling fluid flow between two conduits leading to a fluid utilizing device, and has for an object to provide an improved fluid control valve of this type.

Especially in the aircraft industry, fluid power actuators are becoming more desirable for operating various engine accessories and controls, since with increasing flight speeds there is an increase in ambient operating temperature, rendering electrical power actuators and controls somewhat less reliable. However, the operating conditions and reliability considerations for fluid control valves applicable to aircraft present some special problems. Some of these problems are as follows:

(1) Fluid seals are apt to leak and sliding surfaces present friction problems and are apt to wear and also cause leaks.

(2) Close clearances between relatively moving parts are difficult to maintain, due to thermal shock and temperature differentials.

(3) Where air is employed instead of hydraulic fluid, the air will probably contain more foreign matter than the hydraulic fluid.

Accordingly, a more specific object is to provide a pneumatic control valve which overcomes, or at least minimizes, all of the above mentioned problems.

One of the more commonly employed pneumatic actuators is a reversible air actuated motor or turbine having a turbine impeller provided with a power output shaft and means for admitting pressurized air to the impeller in a first direction to rotate the output shaft in one direction, and means for admitting pressurized air to the impeller in the opposite direction to rotate the output shaft in the opposite direction.

A further object of the invention is to provide an improved unitary valve structure for controlling fluid flow to an actuator of the above type in either direction, and for shutting off fluid flow thereto to stop the actuator in any desired position.

Briefly, the valve structure comprises valve body structure having first and second valve chambers. Each of the chambers has a fluid inlet (connectable to a suitable source of pressurized pneumatic fluid) and a fluid outlet (connectable to one of the inlets of the power actuator). Each of the valve chambers is provided with duplicate valve mechanism for controlling the flow of fluid to the actuator in either direction, as mentioned above, as well as for shutting off all fluid flow thereto when desired.

Each valve mechanism includes an inlet port and an exhaust port disposed in a wall portion of the body and communicating with the associated chamber, and has cooperatively associated therewith an inlet valve member and an exhaust valve member, respectively. The inlet and exhaust valve members are disposed in mutually opposed relation and are each provided with a frusto-conical or otherwise convergent poppet portion, adapted to seat in its associated port and block fluid flow therethrough, and a generally cylindrical portion adapted to be received in its associated port. The inlet and the exhaust valve members are jointly operable, and, to this end, are connected to each other by a yoke structure which may be axially positioned by a suitable control lever.

The second valve mechanism is in inverted relation with the first valve mechanism, thereby to provide a balanced arrangement. Accordingly, when the yoke is disposed at the center of its travel, all of the cylindrical valve portions are disposed in their associated ports, thereby substantially blocking fluid flow therethrough. Although some incipient leakage fluid may be admitted into the two valve chambers from the source of supply, it is admitted thereto and exhausted therefrom in opposing directions and at the same rate. Accordingly, the actuator is deenergized. However, when the yoke is moved to one end of its travel, the inlet valve in the first valve chamber is blocked and the exhaust valve is unblocked, while the inlet valve in the second chamber is unblocked and the exhaust valve is blocked. Accordingly, the fluid supply source is connected through the second valve chamber to the actuator, thereby energizing the actuator in one direction, and the fluid exhausted therefrom is directed to the first chamber and through the open exhaust port to atmosphere.

When the yoke is moved to the other end of its travel, the valve members are moved in the other direction, thereby directing fluid flow from the source of supply through the first valve chamber to the actuator, energizing the actuator for rotation in the opposite direction. The fluid exhausted by the actuator is returned to the first valve chamber and thence through the open exhaust valve to atmosphere.

This arrangement provides a unitary control valve in which fluid flow may be controlled in either of two directions or terminated in an expedient manner. Further, the reaction forces of the fluid are substantially balanced, especially in the off or centered position. Accordingly, the force necessary to position the yoke and its movable valve member is minimized for all settings of the valve.

The foregoing and other objects are effected by the invention as will be apparent from the following description and claims taken in connection with the accompanying drawing, forming a part of this application, in which:

Fig. 1 is a perspective view illustrating a pneumatic power actuator system equipped with a flow control valve formed in accordance with the invention;

Fig. 2 is an enlarged axial sectional view of the flow control valve with the valve members disposed in one operating position;

Fig. 3 is an axial sectional view similar to Fig. 2, but with the valve members disposed in another position;

Fig. 4 is a transverse section taken on line IV—IV of Fig. 3;

Fig. 5 is a highly enlarged diagrammatic view showing the configuration of the ports;

Figure 6:
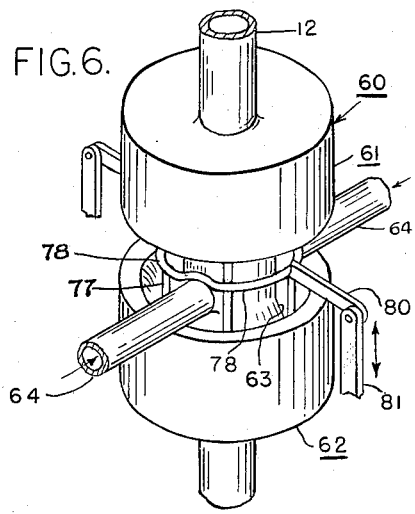
Fig. 6 is a perspective view showing a modified flow control valve.

Referring to the drawings in detail, in Fig. 1 there is shown a pneumatic power actuator system including a reversible pneumatic power actuator 10 connected by a pair of conduits 12 and 13 to a pneumatic flow control valve, generally indicated 15, formed in accordance with the invention.

The actuator 10 forms no part of the invention and may be of any suitable type. However, in the illustration, it is of the rotary type having an output shaft 16 which is rotatable in either direction, as indicated by the arrows, and connected in driving relation to a suitable mechanical control (not shown). As well known in the art, the actuator is provided with a rotary impeller or wheel (not shown) disposed within a casing 17 and driven in one direction by motivating fluid admitted to the casing 17 by the conduit 12, and driven in the opposite direction by motivating fluid directed thereto through the conduit 13. When the conduit 12 is employed as the fluid delivery conduit, the conduit 13 is employed as the exhaust conduit. Conversely, when the conduit 13 is employed as the delivery conduit, the conduit 12 is employed as the exhaust conduit.

In accordance with the invention, the fluid control valve 15 comprises valve body structure including an upper valve body 18 and a lower valve body 19 disposed in mutually spaced relation and rigidly connected to each other by a plurality of struts 20. The upper and lower valve bodies 18 and 19 are connected to a supply conduit 21 by two pairs of branch conduits 22 and 23, respectively, and the supply conduit 21 is connected to a suitable source of pressurized pneumatic fluid, such as air (not shown).

Referring now to F'gs. 2 and 3, wherein the control valve is shown in enlarged detail, it will be seen that the upper valve body 18 defines a chamber 24 disposed in direct communication with the conduit 12 and has a planar lower wall structure 25 defining a plurality of circular inlet ports 26 connecting the chamber to the branch supply conduits 22. The inlet ports, four as shown in this embodiment, are arranged in substantially equally radially spaced relation relative to the central axis of the valve body 18, as best shown in Fig. 4. Further, there is provided a circular exhaust port 27 disposed centrally of the inlet ports 26 and connecting the chamber 24 with the external atmosphere. Each of the inlet ports 26 is provided with a movable poppet valve member 28 adapted to block and unblock the associated port, thereby to interrupt or to permit fluid flow therethrough. The inlet ports are disposed in communication with each other by an annular chamber 29 which, in turn, is in communication with the supply conduits 22. The exhaust port 27 is provided with a movable poppet valve member 30 for controlling fluid flow therethrough.

The inlet and exhaust ports 26 and 27 are of substantially similar shape, and, as best shown in Fig. 5, are of convergent-divergent shape. More specifically, they are provided with a relatively wide convergent inlet portion A, a throat portion B of reduced cross-sectional area, and a gradually widening divergent outlet portion C. Accordingly, as fluid flows therethrough in the direction indicated by the arrows, aerodynamic flow losses are substantially minimized, even though the velocity of the fluid is relatively high.

The inlet ports 26 are disposed in inverted relation relative to the exhaust port 27. Accordingly, the inlet valve members 28 are disposed below their associated ports and are movable upwardly to block the latter, while the exhaust valve member 30 is disposed above its associated port and is moved upwardly to unblock the latter. The inlet valve members 28 and the exhaust valve member 30 are jointly movable by a yoke member 33 comprising a plurality of radially extending arms 34 extending through the inlet ports 26 and connected to each of the inlet valve members 28, and a centrally and longitudinally extending arm 35 connected to the exhaust valve member 30. The central arm 35 is extended downwardly beyond the movable exhaust valve member 30 and through the exhaust port 27 to provide a central shaft portion 36 which extends through a suitable guide member 37 attached to the upper valve body 18, for a purpose subsequently to be described.

The lower valve body 19 is an inverted duplicate of the upper valve body 18 and defines a lower chamber 24' communicating with the outlet conduit 13 and having upper wall structure 25' defining a plurality of inlet ports 26' and an exhaust port 27' cooperatively associated with movable valve members 28' and 30', respectively. The inlet ports 26' provide communication between the branch supply conduits 23 and the chamber 24', while the exhaust port 27' provides communication between the chamber 24' and the external atmosphere. The movable valve members 28' and 30' are jointly movable by a lower yoke member 33' which is inverted but structurally identical to the upper yoke member 33 and connected thereto by the central shaft portion 36.

The upper and lower yoke members 33 and 33' are thereby integrated to form a unitary yoke structure which is axially movable to concomitantly move all of the valve members in the upper valve body 18 and the lower valve body 19.

The unitary yoke structure 33, 33' may be axially positioned with a fine degree of precision by a control lever 38 pivotally connected at one end to a hinge pin 39 supported on the lower valve body 19 and operatively connected to the central shaft 36 by a slot and pin connection 40.

All of the movable valve members, including the inlet and exhaust valve members 28 and 30 in the upper valve body 18, as well as the inlet and exhaust valve member 28' and 30' in the lower valve body 19, are of substantially identical acorn shape. More specifically, as indicated in Fig. 3, they are formed with a convergent poppet portion 41 of frusto-conical shape adapted to seat in the convergent port portion A and a cylindrical portion 42 with a semi-spherical end adapted to be slidably received in the port and to extend beyond the throat B during operation. Hence, it will be noted that when the poppet portions 41 of the valve members are in the blocking position, a positive seal is effected between the poppet portions of the valves and the convergent portions of the ports. Still referring to Fig. 3, it will be noted that when the valve members are moved to the unblocking position, the valve members are completely withdrawn from their associated ports. However, by referring to Fig. 2, it will be noted that in the off or centered position the poppet portions 41 are out of engagement with their associated ports, while the cylindrical portions 42 are partially retained in the ports, thereby to substantially restrict fluid flow therethrough. Such incipient fluid flow as may occur when the valve is in this position has no adverse effects on the system. On the contrary, it permits bleeding of fluid trapped in the power actuator 10 and its communicating conduits 12 and 13 to maintain the system in fluid pressure equilibrium.

Although the control valve 15 is inherently balanced, it may be desirable, although not essential, to provide a plurality of suitable helical spring members 43, 43' for lightly urging the inlet valve members 28 and 28' in opposing directions. Preferably, the bias effect of the upper spring members 43 is greater than that of spring members 43' to minimize the gravitational effect and provide improved stability to the control valve.

*Operation*

When the control valve 15 is positioned as shown in Fig. 2, which position may be termed the off or centered position, the actuator 10 is deenergized. With the control valve in this position fluid flow from the supply conduit 21 into the upper and lower valve bodies 18 and 19 is substantially interrupted and only a slight leakage or incipient flow is permitted through the inlet and exhaust ports. (In the illustration, the leakage clearance has been greatly exaggerated for clarity.)

When it is desired to energize the actuator 10 for rotation in one direction, the control lever 38 is moved to its lower position as illustrated in Fig. 3, thereby moving the yoke structure 33, 33' to its lower position. When the yoke is moved to this position, the upper valve body 18 has its inlet valve members 28 moved to the unblocking position and the exhaust valve member 30 moved to the blocking position. Concomitantly, the lower valve body 19 has its inlet valve members 28' moved downwardly to the blocking position and its exhaust valve member 30' moved downwardly to the unblocking position.

The following fluid flow circuit is thus established. Pressurized fluid from the supply conduit 21 is permitted to flow through the branch inlet conduits 22 and the inlet ports 26 into the chamber 24, and thence directed through the conduit 12 to the power actuator 10, thereby driving its impeller (not shown) and output shaft 16 in said one direction. The fluid exhausted by the power actuator 10 is thence directed through the conduit 13 to the lower chamber 24' and exhausted to the external atmosphere through the open exhaust port 27'.

When it is desired to rotate the power actuator 10 in the opposite direction, the control level 38 is moved upwardly, thereby lifting the yoke structure 33, 33' and causing the inlet valve members 28 in the upper valve body 18 to block the inlet ports 26 and causing the exhaust valve member 30 to unblock the exhaust port 27. Concomitantly, the inlet valve members 28' in the lower valve body are moved upwardly to their port unblocking position, while the exhaust valve member 30' is moved upwardly to its port blocking position. Accordingly, a fluid flow circuit, which is the reverse of the one previously described, is now established, and fluid from the branch inlet conduits 23 is directed through the inlet ports 26' into the lower chamber 24' and thence through the conduit 13 to the power actuator 10, thereby to drive the output shaft 16 in the opposite direction. The fluid exhausted from the power actuator 10 is directed through the conduit 12 into the upper chamber 24 and thence through the open exhaust port 27 to the external atmosphere.

In all operating positions, some of the cylindrical portions of the valve members in each valve body are either fully or partially received in their associated ports, thereby maintaining the valve members in registry with their associated ports and providing a guiding or self-centering effect.

A second embodiment of the invention is illustrated in Figs. 6 to 9, inclusive. Since much of the structure is substantially identical to that shown and described in connection with the first embodiment, only those portions which have been modified will be specifically described.

Referring to Fig. 6, there is shown a fluid control valve 60 having upper and lower valve bodies 61 and 62, respectively, disposed in mutually opposed and inverted relation and connected to each other by an axially extending tubular wall structure 63. The upper valve body 61 is connected to the outlet conduit 12, while the lower valve body 62 is connected to the outlet conduit 13, and the pressurized fluid supply (not shown) is connected to the tubular wall 63 by a pair of diametrically opposed inlet conduits 64.

Figure 7:
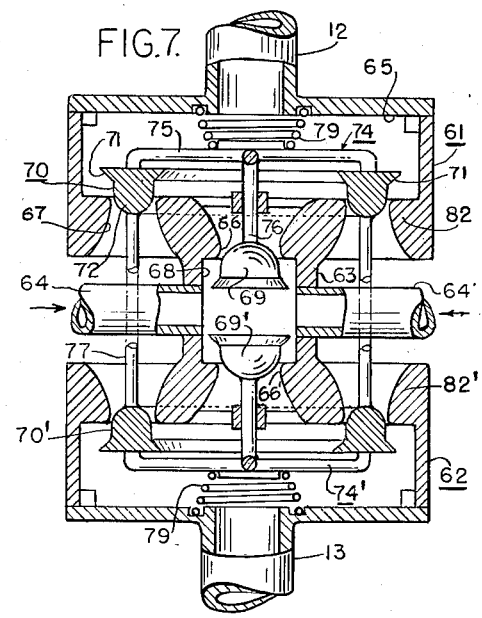
Figs. 7 and 8 are axial sections of the valve shown in Fig. 6 with the valve members in different operating positions.
Figure 8:
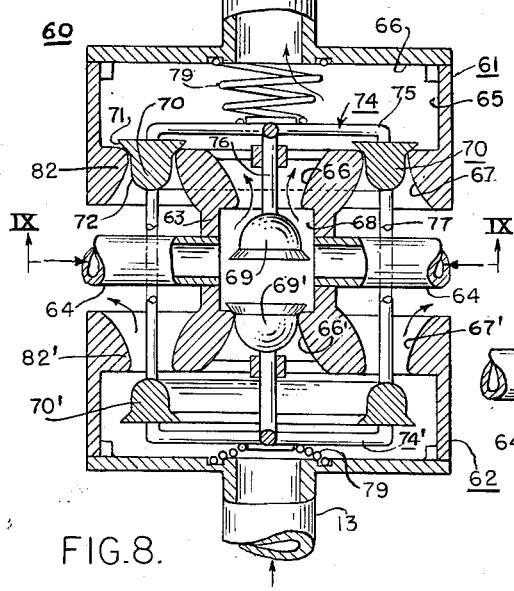
Figure 9:
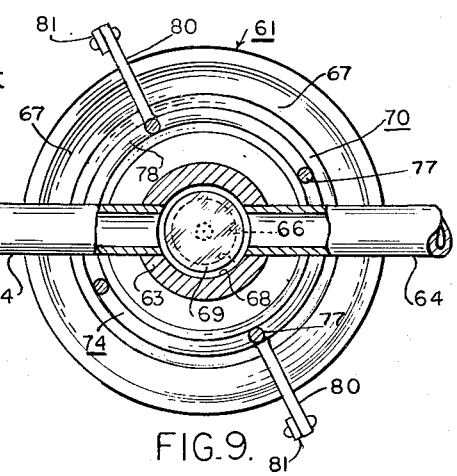
Fig. 9 is a transverse sectional view taken on line IX—IX of Fig. 8.

Referring to Figs. 7, 8 and 9, the upper valve body 61 has a chamber 65 communicating directly with the outlet conduit 12 and communicating with the inlet conduits 64 through an inlet port 66. Further, the chamber 65 is provided with an annular exhaust port 67 communicating with the external atmosphere. The inlet port 66 is concentric with the exhaust port 67 and is connected to the inlet supply conduits 64 through a central passageway 68 formed by the tubular wall 63.

An inlet valve member 69 is provided to control the inlet port 66, while an exhaust valve member 70 is provided to control the exhaust port 67. The inlet valve member 69 may be of generally acorn shape, identical to the movable valve members described in conjunction with the first embodiment, while the exhaust valve member 70 is of annular shape to suit the associated annular exhaust port 67.

However, as shown in Figs. 7 and 8, the exhaust valve member 70 has a cross section which is substantially identical to that of the valve members described in connection with the first embodiment. More specifically, the exhaust valve member is provided with a converging poppet portion 71 and an elongated depending portion 72 formed with parallel sides and a semi-circular end.

The inlet valve member 69 and the exhaust valve member 70 are connected to each other by an upper yoke member 74 having a plurality of radial arms 75 and a longitudinally extending central shaft portion 76 connected to the inlet valve member 69.

The lower valve body 62 is a substantial duplicate of the upper valve body 61, except that it is in inverted relation therewith. The lower valve body is provided with a centrally disposed inlet valve member 69' and an annular exhaust valve member 70'. It will be noted that the inlet valve member 69' is disposed in inverted relation to the inlet valve 69, while the exhaust valve member 70' is disposed in inverted relation to the exhaust valve member 70.

The valve members 69' and 70' are connected to each other for joint operation by a lower yoke member 74'. The upper and lower yoke members 74 and 74', respectively, are integrally connected to each other by a plurality of connecting struts 77 joined by a ring 78 and having their opposite ends connected to the exhaust valve members 70 and 70'. The yoke structure 74, 74', thus formed, may be biased to the off or centered position by a pair light helical springs 79 interposed between the end wall structure of the upper and lower valve bodies.

The yoke structure 74, 74' and the movable valve members connected thereto may be positioned by a control linkage structure including a pair of arms 80, diametrically opposed, and connected to a pair of the vertical struts 77 of the yoke structure. The control arms 80, in turn, are pivotally connected to a pair of translatable links 81 (only partially shown) which, in turn, may be connected to any suitable control, as well known in the art.

The inlet and exhaust ports are of convergent-divergent shape, as more fully shown in Fig. 5, and cooperate with the associated valve members in the same manner previously described in conjunction with the first embodiment.

Also, in a manner similar to the first embodiment, the ports 66 and 67 are disposed in the lower wall 82 of the upper valve body, while the ports 66' and 67' are disposed in the upper wall 82' of the lower valve body.

Operation

In Fig. 7, the fluid control valve 60 is shown in the off or centered position and only incipient fluid flow is permitted past the substantially blocked ports. Hence, as previously described, the actuator 10 is deenergized.

In Fig. 8, the control valve 60 is shown in the position it assumes when the control arms 80 are moved downwardly. In this position, the movable valve members are so positioned that fluid is admitted through the branch inlet conduits 64 into the central passageway 68 and thence upwardly through the inlet port 66 to the upper chamber 65 from whence it is directed through the conduit 12 to the power actuator 10, driving the actuator in one direction. The fluid is then returned by conduit 13 to the lower valve body 62 and exhausted through its open port to the external atmosphere.

When it is desired to drive the actuator in the opposite direction, the control arms 80 are moved upwardly, thereby moving the yoke structure 74, 74' and its associated valve members to the upper position and reversing the fluid flow through the actuator.

It will now be seen that the invention provides a symmetrical pneumatic flow control valve which has relatively few moving parts and which is inherently self-balanced, so that the flow reaction forces are balanced in the off position and permit positioning the control valve with only a moderate amount of force.

It will further be seen that the invention provides a flow control valve which obviates sealing problems and which may be manufactured without the necessity of maintaining close fits between relatively movable parts.

While the invention has been shown in several forms, it will be obvious to those skilled in the art that it is not so limited, but is susceptible of various other changes and modifications without departing from the spirit thereof.

What is claimed is:

1. A fluid control valve comprising a valve body structure having wall structure, said wall structure having a fluid inlet port and a fluid exhaust port; each of said ports being of convergent-divergent shape in the direction of fluid flow and having a convergent portion, a divergent portion and a restricted throat portion disposed intermediate said convergent and divergent portions; an inlet poppet valve member and an exhaust poppet valve member cooperatively associated, respectively, with said inlet port and said exhaust port; each of said poppet valve members having a convergent portion adapted to seat on the convergent portion of its associated port and a cylindrical portion adapted to be slidably received in the throat portion of its associated port; means including a yoke connected to said poppet valve members and operable to jointly move the latter; said yoke having an arm portion extending through one of said ports and connected to the valve member associated therewith; said inlet poppet valve member and said exhaust poppet valve member being in mutually opposed relation; said yoke being movable in one direction to move the convergent and cylindrical portions of said inlet poppet valve member out of blocking relation with said inlet port and the convergent and cylindrical portions of said exhaust poppet valve member into blocking relation with said exhaust port; said yoke being movable to an intermediate position in which the convergent portions of both valve members are disposed in unblocking relation with their associated ports, but the cylindrical portions are positioned adjacent the throat portions of the ports to substantially block fluid flow therethrough; and said yoke being movable in the opposite direction to move the convergent and cylindrical portions of said inlet poppet valve member into blocking relation with said inlet port and the convergent and cylindrical portions of said exhaust poppet valve member out of blocking relation with said exhaust port.

2. A fluid control valve comprising a valve body having a first body portion and a second body portion, said first and second body portions respectively having first and second chambers, first and second inlet ports disposed respectively in said first and second body portions and communicating respectively with said first and second chambers, first and second exhaust ports disposed respectively in said first and second body portions and communicating respectively with said first and second chambers, first and second inlet poppet valve members and first and second exhaust poppet valve members cooperatively associated respectively with said inlet ports and said exhaust ports, each of said poppet valve members having a poppet portion adapted to seat on its associated port and a cylindrical portion adapted to be received in its associated port, means connected to each of said poppet valve members and operable to jointly move the latter, said first and second inlet poppet valves being in mutually opposed relation and said first and second exhaust poppet valves being in mutually opposed relation, said means being movable in one direction to move said first inlet poppet valve member and said second exhaust poppet valve member in port unblocking direction and said second inlet poppet valve member and said first exhaust poppet valve member in port blocking direction, said means having an intermediate position in which all of the poppet portions of said valve members are unseated but said ports are substantially blocked by the cylindrical portions of said valve members, and said means being movable in the opposite direction to move said first inlet poppet valve member and said second exhaust poppet valve member in port blocking direction and said second inlet poppet valve member and said first exhaust poppet valve member in port unblocking direction.

3. A fluid control valve comprising a valve body having first and second chambers, first wall structure having inlet and exhaust ports communicating with said first chamber, second wall structure having second inlet and exhaust ports communicating with said second chamber, first and second inlet poppet valve members and first and second exhaust poppet valve members cooperatively associated respectively with said first and second inlet and exhaust ports, each of said poppet valve members having a poppet portion adapted to seat on its associated port and a cylindrically shaped portion adapted to be received in the associated port, means connected to each of said poppet valve members and operable to jointly move the latter, said first and second inlet poppet valves being in mutually opposed relation and said first and second exhaust poppet valves being in mutually opposed relation, said ports and said valve members being so formed and arranged that when said means is moved in one direction said first inlet poppet valve member and said second exhaust poppet valve member are moved to their port unblocking positions and said second inlet poppet valve member and said first exhaust poppet valve member are moved to their port blocking positions, said valve members having an intermediate position in which all of the poppet portions of said valve members are unseated but said ports are substantially blocked by the cylindrically shaped portions of said poppet valve members, and said means being movable in the opposite direction to move said first inlet poppet valve member and said second exhaust poppet valve member to their port blocking positions and said second inlet poppet valve member and said first exhaust poppet valve member to their port unblocking positions, one pair of said ports being of annular shape and one pair of said valve members being of annular shape and associated therewith, and another pair of said ports being coaxially disposed relative to said pair of annular ports.

References Cited in the file of this patent

UNITED STATES PATENTS

| | | |
|---|---|---|
| 2,019,193 | Mueller | Oct. 29, 1935 |
| 2,247,090 | Jones | June 24, 1941 |
| 2,889,851 | Andemar | June 9, 1959 |